United States Patent
Liang et al.

(10) Patent No.: US 10,452,604 B2
(45) Date of Patent: Oct. 22, 2019

(54) METHOD AND BUS FOR ACCESSING DYNAMIC RANDOM ACCESS MEMORY

(71) Applicant: Huawei Technologies Co., Ltd., Shenzhen (CN)

(72) Inventors: Jun Liang, Beijing (CN); Hu Liu, Shenzhen (CN); Zhiqiang Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 15/454,014

(22) Filed: Mar. 9, 2017

(65) Prior Publication Data

US 2017/0262404 A1   Sep. 14, 2017

(30) Foreign Application Priority Data

Mar. 10, 2016   (CN) .......................... 2016 1 0135661

(51) Int. Cl.
 *G06F 15/167*   (2006.01)
 *G06F 13/16*   (2006.01)
(52) U.S. Cl.
 CPC ............ *G06F 15/167* (2013.01); *G06F 13/16* (2013.01); *Y02D 10/14* (2018.01)
(58) Field of Classification Search
 None
 See application file for complete search history.

(56) References Cited

U.S. PATENT DOCUMENTS

| 7,305,540 | B1 |  | 12/2007 | Trivedi et al. |
| 7,805,587 | B1 | * | 9/2010 | Van Dyke ............... G06F 12/10 |
|  |  |  |  | 711/202 |
| 8,345,701 | B1 | * | 1/2013 | Davis ..................... H04L 49/10 |
|  |  |  |  | 370/412 |

(Continued)

FOREIGN PATENT DOCUMENTS

| CN | 102043729 A | 5/2011 |
| CN | 104346404 A | 2/2015 |

OTHER PUBLICATIONS

Machine Translation and Abstract of Chinese Publication No. CN102043729, May 4, 2011, 16 pages.

(Continued)

*Primary Examiner* — Esther B. Henderson
(74) *Attorney, Agent, or Firm* — Conley Rose, P.C.

(57) ABSTRACT

Embodiments of the present disclosure provide a method and bus for accessing a dynamic random access memory (DRAM). The embodiments include receiving an access instruction, where the access instruction includes an access address, the access address includes a physical address, and a first field and a second field that are additionally set, the first field is used to indicate an interleaving mode, the interleaving mode indicates a manner of selecting an access channel, the second field is used to indicate an interleaving granularity, and the interleaving granularity indicates a capacity of an address space corresponding to the access channel; determining, according to the first field and the second field, the access channel and an address corresponding to the access channel; and accessing the DRAM according to the access channel and the address corresponding to the access channel.

20 Claims, 5 Drawing Sheets

(56) References Cited

U.S. PATENT DOCUMENTS

| | | |
|---|---|---|
| 8,762,595 B1 | 6/2014 | Muller et al. |
| 9,218,278 B2 | 12/2015 | Talagala et al. |
| 2005/0144413 A1* | 6/2005 | Kuo .................. G06F 13/4243 |
| | | 711/170 |
| 2015/0081989 A1 | 3/2015 | Lee et al. |
| 2015/0095595 A1* | 4/2015 | Wang ................. G06F 12/0607 |
| | | 711/157 |
| 2015/0254177 A1* | 9/2015 | Ikeda ................. G06F 12/1009 |
| | | 711/148 |

OTHER PUBLICATIONS

Machine Translation and Abstract of Chinese Publication No. CN104346404, Feb. 11, 2015, 60 pages.
Foreign Communication From a Counterpart Application, Chinese Application No. 201610135661.4, Chinese Office Action dated Jun. 4, 2019, 6 pages.

* cited by examiner

METHOD AND BUS FOR ACCESSING DYNAMIC RANDOM ACCESS MEMORY

CROSS-REFERENCE TO RELATED APPLICATION

This application claims priority to Chinese Patent Application No. 201610135661.4, filed on Mar. 10, 2016, which is hereby incorporated by reference in its entirety.

TECHNICAL FIELD

The present disclosure relates to the communications field, and more specifically, to a method and bus for accessing a dynamic random access memory (DRAM).

BACKGROUND

In the design of the bus storage architecture of an application processor (AP) in the prior art, when a central processing unit (CPU) or an input/output (TO) peripheral accesses a low power double data rate 4 dynamic random access memory (LPDDR4 DRAM), four access channels generally need to be accessed in an address interleaving manner, and an interleaving granularity is statically configured.

When a CPU or an IO peripheral accesses a DRAM by using the existing bus storage architecture, there exist the following disadvantages. In some application scenarios (for example, voice conversation or audio playback) in which an AP processes a low bandwidth demand, compared with accessing the DRAM by using a single access channel, accessing the DRAM by using a four-access channel interleaving mode in the prior art has higher power consumption, if a single access channel is reserved for an address space to access the DRAM, address segments, which are parallel to the address space, of the other three access channels cannot be used, when the CPU and the IO device has large (mainly media Internet Protocol) bandwidth traffic in some scenarios, an access channel cannot be isolated in the four-access channel interleaving mode in the prior art, resulting in bus congestion, and in some scenarios, access modes for accessing the DRAM are different in different Internet Protocols (IPs), resulting in communication disparity of the DRAM.

SUMMARY

This application provides a method and bus for accessing a dynamic random access memory DRAM so that a control manner with multiple interleaving modes and interleaving granularities can be supported.

According to a first aspect, a method for accessing a DRAM is provided, including receiving an access instruction, where the access instruction includes an access address, the access address includes a physical address, and a first field and a second field that are additionally set, the first field is used to indicate an interleaving mode, the interleaving mode indicates a manner of selecting an access channel, the second field is used to indicate an interleaving granularity, and the interleaving granularity indicates a capacity of an address space corresponding to the access channel, determining, according to the first field and the second field, the access channel and an address corresponding to the access channel, and accessing the DRAM according to the access channel and the address corresponding to the access channel.

The bus receives an access instruction for accessing an LPDDR4 device sent by a CPU or an IO peripheral, the access instruction includes an access address for accessing a DRAM, and a first field in the access address indicates an interleaving mode, and a second field in the access address indicates an interleaving granularity. In this way, an interleaving mode for accessing the DRAM can be determined according to the first field, and an interleaving granularity for accessing the DRAM can be determined according to the second field. Further, an access channel for accessing the DRAM and an address corresponding to the access channel can be determined according to the interleaving mode and the interleaving granularity. In this way, the bus accesses the DRAM according to the determined access channel and the address corresponding to the access channel.

Therefore, according to the method for accessing a DRAM in this embodiment of the present disclosure, an access instruction including an access address is received, where a first field additionally set in the access address indicates an interleaving mode and a second field additionally set in the access address indicates an interleaving granularity, an access channel and an address corresponding to the access channel are determined according to the interleaving mode and the interleaving granularity, and the DRAM is accessed according to the access channel and the address corresponding to the access channel, so as to implement a control manner that can simultaneously support multiple interleaving modes and interleaving granularities, and configuration of the multiple interleaving granularities according to different requirements, thereby improving bandwidth balance and utilization of the access channels.

With reference to the first aspect, in a first possible implementation manner of the first aspect, the determining, according to the first field and the second field, the access channel and an address corresponding to the access channel includes, when a value of the first field indicates that the interleaving mode is a 3+1 access channel interleaving mode, determining a third field in the physical address, where the third field is used to instruct to access the DRAM by using three access channels in an interleaving manner, or access the DRAM by using a single access channel, when a value of the third field instructs to access the DRAM by using three access channels in an interleaving manner, determining a fourth field in the physical address, where the fourth field is used to instruct to select an access channel from the three access channels, determining a value of the fourth field according to a value of the second field, determining, according to a preset mapping relationship between different values of the fourth field and the three access channels, a first access channel corresponding to the value of the fourth field, and determining, according to the value of the fourth field, an address corresponding to the first access channel.

With reference to the first possible implementation manner of the first aspect, in a second possible implementation manner of the first aspect, the method further includes, when a value of the third field instructs to access the DRAM by using a single access channel, determining, according to the third field, the single access channel and an address corresponding to the single access channel.

In the 3+1 access channel interleaving mode, an access channel is isolated to form a single access channel, and the other three access channels are interleaved to access the DRAM. If two bits are configured for the first field that indicates an access channel interleaving mode (assuming that chan_mode[1:0] is used to indicate an interleaving mode), it is determined, according to a preset value of the first field, that is, when chan_mode[1:0] is 2'b01, that the CPU or the IO peripheral accesses the DRAM by using the 3+1 access channel interleaving mode. Further, a single access channel may be determined according to the value of the third field, that is, when PA[32:31]=2'b11, and the access instruction accesses only a channel 3, when PA[32:31] !=2'b11, the access instruction accesses three access channels of the DRAM: an access channel 0, an access channel 1, and an access channel 2 in an interleaving manner.

When the access instruction accesses the three access channels, the access channel 0, the access channel 1, and the access channel 2 in an interleaving manner, an access channel is selected according to PA[x+4:x] (x∈[7:12], and when a value of chan_gran ranges from 1 to 6, x=6+chan_gran[2:0], and in other cases, x=7), and can be obtained by looking up the following Table 3. Correspondingly, an address corresponding to the access channel may be represented by PA[30:0]={(PA[32:x+5]*11+mode3_foor_PA[3:0], PA[x−1:0]}, where a value of mode3_foor_PA[3:0] can be obtained by looking up the following Table 3.

Therefore, when the DRAM can be accessed by using only some channels in a particular application scenario, power consumption can be reduced by using an isolated single channel to access the DRAM, or, when the CPU and the IO peripheral access the DRAM at the same time, utilization of the DRAM can be improved by means of channel isolation. In addition, after a single access channel is reserved, channel space corresponding to three access channels that are parallel to the single access channel is used in the same way as channel space corresponding to the four access channels.

With reference to the first aspect, in a third possible implementation manner of the first aspect, the determining, according to the first field and the second field, the access channel and an address corresponding to the access channel includes, when a value of the first field indicates that the interleaving mode is a four-access channel interleaving mode, determining a seventh field in the physical address, where the seventh field is used to instruct to select an access channel from the four access channels to access the DRAM, determining a value of the seventh field according to a value of the second field, determining, according to a preset mapping relationship between different values of the seventh field and the four access channels, a third access channel corresponding to the value of the seventh field, and determining, according to the seventh field, an address corresponding to the third access channel.

In the four-access channel interleaving mode, the CPU or the IO peripheral sends an instruction for accessing a DRAM, and accesses, according to different address interleaving granularities, four access channels of the DRAM in an interleaving manner. It can be known from the foregoing that according to the first field that indicates an access channel interleaving mode, when the value of the first field, namely, chan_mode[1:0], is 2'b00, the CPU or the IO peripheral accesses the DRAM by using the four-access channel interleaving mode.

A value of x is determined according to the value of the second field, that is, when a value of chan_gran ranges from 1 to 6, x=6+chan_gran[2:0], and in other cases, x=7. Further, a channel in the four-access channel interleaving mode is selected according to PA[x+1:x], and an address corresponding to the selected access channel is determined according to PA[30:0]={PA[32:x+2], PA[x−1:0]}.

With reference to the first aspect, in a fourth possible implementation manner of the first aspect, the determining, according to the first field and the second field, the access channel and an address corresponding to the access channel includes, when the first field indicates that the interleaving mode is a double-access channel interleaving mode, determining a fifth field in the physical address, where the fifth field is used to instruct to select an access channel combination from two access channel combinations, and when the value of the fifth field instructs to access, in an interleaving manner, the DRAM by using two access channels in the first access channel combination, determining a sixth field in the physical address, where the sixth field is used to instruct to select an access channel from the first access channel combination to access the DRAM, determining a value of the sixth field according to a value of the second field, determining, according to a preset correspondence between different values of the sixth field and the access channels in the first access channel combination, a second access channel corresponding to the value of the sixth field, and determining, according to the fifth field and the sixth field, an address corresponding to the second access channel.

In the double-access channel interleaving mode, four access channels are classified into two combinations, accessing is performed in an interleaving manner by using two access channels in each combination, and access channels in one combination are isolated from those in the other combination. When chan_mode[1:0] is 2'b10, the CPU or the IO peripheral accesses the DRAM by using the double-access channel interleaving mode.

Specifically, when PA[32]=1'b0, the access instruction accesses the DRAM by using an access channel 0 and an access channel 1 in an interleaving manner. A value of x is determined according to the value of the second field, that is, when a value of chan_gran ranges from 1 to 6, x=6+chan_gran[2:0], and in other cases, x=7. Further, an access channel is selected from the access channel 0 and the access channel 1 according to PA[x], and an address corresponding to the selected access channel is determined according to PA[30:0]={PA[31:x+2], PA[x−1:0]}.

When PA[32]=1'b0, the access instruction accesses the DRAM by using an access channel 2 and an access channel 3 in an interleaving manner. A value of x is determined according to the value of the second field, that is, when a value of chan_gran ranges from 1 to 6, x=6+chan_gran[2:0], and in other cases, x=7. Further, an access channel is selected from the access channel 2 and the access channel 3 according to PA[x], and an address corresponding to the selected access channel is determined according to PA[30:0]={PA[31:x+2], PA[x−1:0]}.

With reference to the first aspect, in a fifth possible implementation manner of the first aspect, the determining, according to the first field and the second field, the access channel and an address corresponding to the access channel includes, when the first field indicates that the interleaving mode is a single-access channel mode, determining an eighth field in the physical address, where the eighth field is used to instruct to select a single access channel to access the DRAM, and determining, according to the eighth field, the selected single access channel and an address corresponding to the single access channel.

An access channel for the access instruction is selected according to PA[32:31]: When PA[32:31]=2'b00, the instruction accesses only a channel 0, when PA[32:31]=2'b01, the instruction accesses only a channel 1, when PA[32:31]=2'b10, the instruction accesses only a channel 2, and when PA[32:31]=2'b11, the instruction accesses only a channel 3. Correspondingly, an access address corresponding to the access channel is PA[30:0]=PA[30:0].

In some possible implementation manners, a length of the first field is two bits.

In some possible implementation manners, a length of the second field is three bits.

Other lengths may be used as the length of the first field and the length of the second field, which are not limited in the present disclosure.

In some possible implementation manners, there is a one-to-one mapping between values of the first field and interleaving modes.

The bus may preset that when the value of the first field chan_mode[1:0] is 2'b00, the CPU or the IO peripheral accesses the DRAM by using the four-access channel interleaving mode, when chan_mode[1:0] is 2'b01, the CPU or the IO peripheral accesses the DRAM by using the 3+1 access channel interleaving mode, when chan_mode[1:0] is 2'b10, the CPU or the IO peripheral accesses the DRAM by using the double-access channel interleaving mode, and when chan_mode[1:0] is 2'b11, there is no address interleaving between access channels. Therefore, a mode of accessing a DRAM by the access instruction may be determined according to a preset mapping relationship between high-order addresses and access modes.

In some possible implementation manners, there is a one-to-one mapping between values of the second field and interleaving granularities.

If the value of the second field chan_gran[2:0]=3'b000 or 3'b111, the interleaving granularity may be 128 bytes, when chan_gran[2:0]=1, a corresponding interleaving granularity supports 128 bytes, when chan_gran[2:0]=2, a corresponding interleaving granularity supports 256 bytes, when chan_gran[2:0]=3, a corresponding interleaving granularity supports 512 bytes, when chan_gran[2:0]=4, a corresponding interleaving granularity supports 1024 bytes, when chan_gran[2:0]=5, a corresponding interleaving granularity supports 2048 bytes, and when chan_gran[2:0]=6, a corresponding interleaving granularity supports 4096 bytes.

In some possible implementation manners, the interleaving granularity includes any one of 128 bytes, 256 bytes, 512 bytes, 1024 bytes, 2048 bytes, or 4096 bytes.

According to a second aspect, an apparatus for accessing a DRAM is provided, and the apparatus includes a receiving module, configured to receive an access instruction, where the access instruction includes an access address, the access address includes a physical address, and a first field and a second field that are additionally set, the first field is used to indicate an interleaving mode, the interleaving mode indicates a manner of selecting an access channel, the second field is used to indicate an interleaving granularity, and the interleaving granularity indicates a capacity of an address space corresponding to the access channel, a determining module, configured to determine, according to the first field and the second field, the access channel and an address corresponding to the access channel, and an accessing module, configured to access the DRAM according to the access channel and the address corresponding to the access channel.

With reference to the second aspect, in a first possible implementation manner of the second aspect, the determining module is specifically configured to, when a value of the first field indicates that the interleaving mode is a 3+1 access channel interleaving mode, determine a third field in the physical address, where the third field is used to instruct to access the DRAM by using three access channels in an interleaving manner, or access the DRAM by using a single access channel, when a value of the third field instructs to access the DRAM by using three access channels in an interleaving manner, determine a fourth field in the physical address, where the fourth field is used to instruct to select an access channel from the three access channels, determine a value of the fourth field according to a value of the second field, determine, according to a preset mapping relationship between different values of the fourth field and the three access channels, a first access channel corresponding to the value of the fourth field, and determine, according to the value of the fourth field, an address corresponding to the first access channel.

With reference to the first possible implementation manner of the second aspect, in a second possible implementation manner of the second aspect, the apparatus is further configured to, when the value of the third field instructs to access the DRAM by using a single access channel, determine, according to the third field, the single access channel and an address corresponding to the single access channel.

With reference to the second aspect, in a third possible implementation manner of the second aspect, the determining module is specifically configured to, when the first field indicates that the interleaving mode is a double-access channel interleaving mode, determine a fifth field in the physical address, where the fifth field is used to instruct to select an access channel combination from two access channel combinations to access the DRAM, when a value of the fifth field instructs to access, in an interleaving manner, the DRAM by using two access channels in a first access channel combination, determine a sixth field in the physical address, where the sixth field is used to instruct to select an access channel from the first access channel combination to access the DRAM, determine a value of the sixth field according to the value of the second field, determine, according to a preset correspondence between different values of the sixth field and the access channels in the first access channel combination, a second access channel corresponding to the value of the sixth field, and determine, according to the fifth field and the sixth field, an address corresponding to the second access channel.

With reference to the second aspect, in a fourth possible implementation manner of the second aspect, the determining module is specifically configured to, when the value of the first field indicates that the interleaving mode is a four-access channel interleaving mode, determine a seventh field in the physical address, where the seventh field is used to instruct to select an access channel from the four access channels to access the DRAM, determine a value of the seventh field according to the value of the second field, determine, according to a preset mapping relationship between different values of the seventh field and the four access channels, a third access channel corresponding to the value of the seventh field, and determine, according to the seventh field, an address corresponding to the third access channel.

With reference to the second aspect, in a fifth possible implementation manner of the second aspect, the determining module is specifically configured to, when the first field indicates that the interleaving mode is a single-access channel mode, determine an eighth field in the physical address, where the eighth field is used to instruct to select a single channel to access the DRAM, and determine, according to the eighth field, the selected single access channel and an address corresponding to the selected single access channel.

With reference to the second aspect and any possible implementation manner of the first possible implementation manner of the second aspect to the fifth possible implementation manner of the second aspect, in a sixth possible implementation manner of the second aspect, the first field includes at least two bits, and the second field includes at least three bits.

With reference to the second aspect and any possible implementation manner of the first possible implementation manner of the second aspect to the sixth possible implementation manner of the second aspect, in a seventh possible implementation manner of the second aspect, the interleaving granularity includes any one of 128 bytes, 256 bytes, 512 bytes, 1024 bytes, 2048 bytes, or 4096 bytes.

According to a third aspect, a system for accessing a DRAM is provided, and the system includes a CPU or an IO device, a bus, and the DRAM.

Based on the foregoing technical solutions, according to the method and bus for accessing a DRAM in the embodiments of the present disclosure, an access instruction including an access address is received, where a first field additionally set in the access address indicates an interleaving mode, and a second field additionally set in the access address indicates an interleaving granularity, an access channel and an address corresponding to the access channel are determined according to the interleaving mode and the interleaving granularity, and the DRAM is accessed according to the access channel and the address corresponding to the access channel, so as to implement a control manner that can simultaneously support multiple interleaving modes and interleaving granularities.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In a microcomputer system, a memory generally consists of multiple storage chips and corresponding storage controllers, and is connected to a CPU and other components through a storage bus (a data bus, an address bus, a control bus, and the like), to implement transmission of data and control information.

Figure 1:
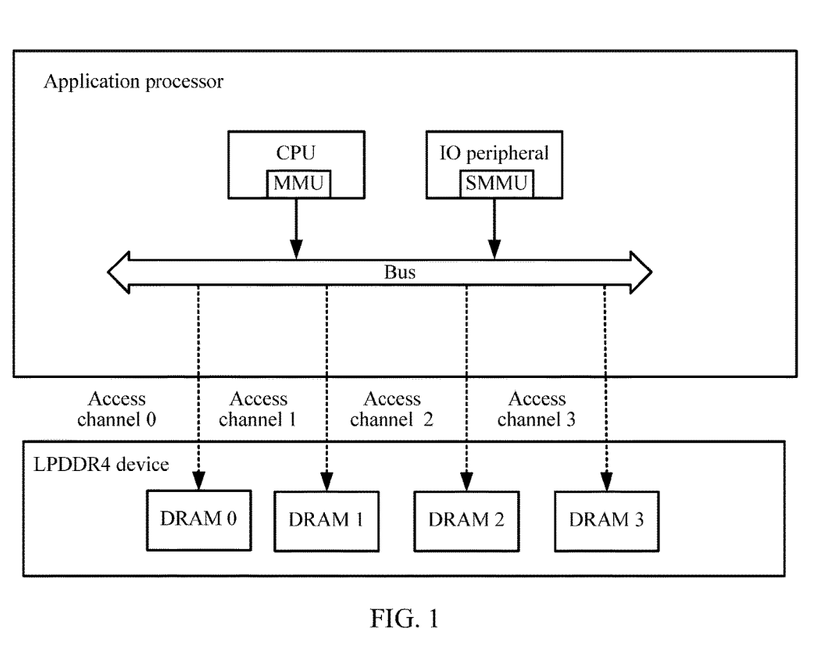
FIG. 1 is a schematic diagram of a system for accessing a DRAM in the prior art.

FIG. 1 is a schematic diagram of an existing bus storage architecture. As shown in FIG. 1, a CPU or an IO peripheral accesses, by using four access channels, information stored in a DRAM. A bit width of a physical address (PA) that is used by the CPU or the IO peripheral to access a DRAM is 32 bits, and can map a maximum of an 8-gigabyte (GB) DRAM corresponding to the four access channels, and DRAM storage space corresponding to each access channel is 2 GB.

An interleaving granularity in the prior art is statically configured, and the interleaving granularity refers to a maximum capacity that an address of a DRAM corresponding to an access channel can map. For example, using an interleaving granularity of 128 bytes as an example, for a DRAM address corresponding to a Channel 0 (an access channel), 0-128 bytes of the DRAM can be accessed by using the Channel 0.

In the four-access channel interleaving mode in the prior art, an access channel for accessing a DRAM is selected by using PA[x+1:x] (x∈[7:12]) (that is, accessing in an interleaving manner). A value of x may be determined according to an interleaving granularity. The specific value of x is determined before all CPUs or IOs access a DRAM after a whole chip is powered on, that is, static control over access of the CPUs or IO peripherals to the DRAM is implemented. For example, when an interleaving granularity is 128 (that is, $2^7$) bytes, x=7. In this way, a DRAM address corresponding to each access channel can also be determined, and the DRAM address corresponding to the access channel can be represented by PA[30:0]={PA[32:x+2], PA[x−1:0]}.

For example, if an interleaving granularity is 128 bytes, it can be determined that x=7, and then PA[x+1:x]=PA[8:7], that is, an access channel for accessing the DRAM is selected according to values of 7 bit and 8 bit. If PA[8:7]=2'b00, it can be determined that an access channel 0 is to be used, and an address corresponding to the access channel 0 is determined according to PA[30:0]={PA[32:9], PA[6:0]}, thereby completing access to DRAM 0 by using the Channel 0.

Similarly, if PA[8:7]=2'b01, an address corresponding to the access channel 1 is determined according to PA[30:0]={PA[32:9], PA[6:0]}, and DRAM 1 is accessed by using the Channel 1, if PA[8:7]=2'b10, an address corresponding to the access channel 2 is determined according to PA[30:0]={PA[32:9], PA[6:0]}, and DRAM 2 is accessed by using the Channel 2, or if PA[8:7]=2'b11, an address corresponding to the access channel 3 is determined according to PA[30:0]={PA[32:9], PA[6:0]}, and DRAM 3 is accessed by using the Channel 3.

However, when a CPU or an IO peripheral accesses a DRAM by using the existing bus storage architecture, there exist disadvantages. For example, in some application scenarios (for example, voice conversation or audio playing) in which an AP processes a low bandwidth demand, compared with accessing the DRAM by using a single access channel, accessing the DRAM by using a four-access channel interleaving mode in the prior art has higher power consumption, if a single access channel is reserved for an address space to access the DRAM, address segments, which are parallel to the address space, of the other three access channels cannot be used, when the CPU and the IO device has large (mainly media IP) bandwidth traffic in some scenarios, an access channel cannot be isolated in the four-access channel interleaving mode in the prior art, resulting in bus congestion, and in some scenarios, access modes for accessing the DRAM are different in different IPs, resulting in communication disparity of the DRAM.

Figure 2:
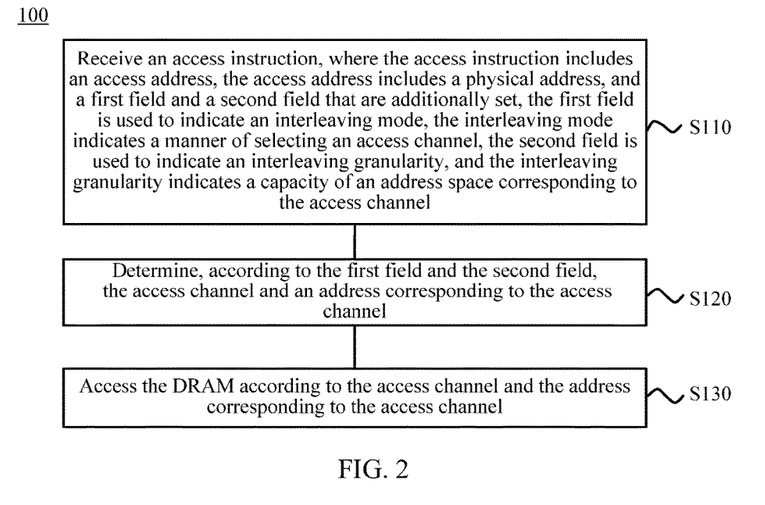
FIG. 2 is a schematic diagram of a method for accessing a DRAM according to an embodiment of the present disclosure.

FIG. 2 is a schematic diagram of a method 100 for accessing a dynamic random access memory DRAM according to an embodiment of the present disclosure. The method 100 for accessing a dynamic random access memory DRAM includes:

S110: Receive an access instruction, where the access instruction includes an access address, the access address includes a physical address, and a first field and a second field that are additionally set, the first field is used to indicate an interleaving mode, the interleaving mode indicates a manner of selecting an access channel, the second field is used to indicate an interleaving granularity, and the interleaving granularity indicates a capacity of an address space corresponding to the access channel.

S120: Determine, according to the first field and the second field, the access channel and an address corresponding to the access channel.

S130: Access the DRAM according to the access channel and the address corresponding to the access channel.

Specifically, a bus receives an access instruction for accessing an LPDDR4 device sent by a CPU or an IO peripheral. The access instruction includes an access address for accessing a DRAM, a first field in the access address indicates an interleaving mode, and a second field in the access address indicates an interleaving granularity. In this way, an interleaving mode for accessing the DRAM can be determined according to the first field, and an interleaving granularity for accessing the DRAM can be determined according to the second field. Further, an access channel for accessing the DRAM and an address corresponding to the access channel can be determined according to the interleaving mode, the interleaving granularity, and the physical address. In this way, the bus accesses the DRAM according to the determined access channel and the address corresponding to the access channel.

It should be noted that, when sending an access instruction to the bus, the CPU may perform address translation by using a memory management unit (MMU), or when sending an access instruction to the bus, the IO peripheral may perform address translation by using a system memory management unit (SMMU). When the bus accesses a DRAM, a bus instruction may further be converted into an instruction recognizable to the DRAM by using a dynamic memory controller (DMC), and a physical layer (PHY) analog interface and the like may be needed to complete the accessing process. This is not limited in the present disclosure.

It should be understood that the IO peripheral may be a display, a camera, and the like, which is not limited in the present disclosure.

Therefore, according to the method for accessing a DRAM in this embodiment of the present disclosure, an access instruction including an access address is received, where a first field additionally set in the access address indicates an interleaving mode, and a second field additionally set in the access address indicates an interleaving granularity, an access channel and an address corresponding to the access channel are determined according to the interleaving mode and the interleaving granularity, and the DRAM is accessed according to the access channel and the address corresponding to the access channel, so as to implement a control manner that can simultaneously support multiple interleaving modes and interleaving granularities.

In S110, the CPU or the IO peripheral extends the access address in the access instruction, and uses extended fields to indicate an interleaving mode and an interleaving granularity respectively, so as to implement a control manner that can flexibly and simultaneously support multiple interleaving modes and interleaving granularities.

Optionally, a length of the first field is two bits.

Optionally, a length of the second field is three bits.

Figure 3:
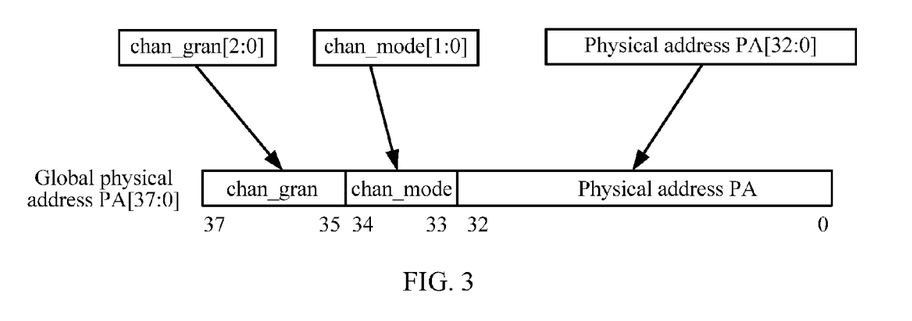
FIG. 3 is a schematic diagram of a method for accessing a DRAM according to an embodiment of the present disclosure.

Specifically, the CPU or the IO peripheral extends the access address in the access instruction (as shown in FIG. 3), five bits may be extended at a high order of the address. Two bits (that is, chan_mode[1:0]) of the five bits are used to indicate an access channel interleaving mode, and the remaining three bits (that is, chan_gran[2:0]) are used to indicate an interleaving granularity.

It should be understood that, the address extension may be extension of a high-order address, or may be extension of a low-order address. However, when a low-order address is extended, correspondingly, addresses at other locations need to be moved. This is not limited in this embodiment of the present disclosure.

It should be further understood that lengths of the first field and the second field may be other lengths, which are not limited in the present disclosure.

Optionally, for an IP that supports an MMU central processing unit/a graphics processing unit or an SMMU, an IO peripheral, such as a display/an image processor/a video codec/a video decoder), an operating system (OS) kernel implements, by modifying a high-order bit of a page table (only applicable to a long page table), dynamic management on an interleaving mode and an interleaving granularity of an access channel.

If a peripheral has no MMU or SMMU but supports an IP having a 64-bit address, and accesses a DRAM in a manner of a linked list (a pointer in a linked list descriptor has 64 bits), drive software may modify the IP by managing the linked list descriptor to access a high-order address of the DRAM. For an IP having an address of only 32 bits, the drive software configures an extended high-order address by using a register, to implement dynamic management on an interleaving mode and an interleaving granularity of an access channel.

In addition, in a software solution application, chan_gran[2:0] is driven and maintained by bottom-layer software, and is transparent to hardware, while chan_mode[1:0] is a visible address, and then a visible global address of the OS kernel is Global PA[34:0]={chan_mode[1:0], PA[32:0]}. Therefore, the OS kernel and some drivers that need to be optimized are, after being processed, transparent to other software, and such division is relatively clean.

Optionally, there is a one-to-one mapping between values of the first field and interleaving modes.

Specifically, the first field may indicate an interleaving mode by using a length of two bits. Specifically, the bus may preset that when the value of the first field chan_mode[1:0] is 2'b00, the CPU or the IO peripheral accesses the DRAM by using a four-access channel interleaving mode, when the value of chan_mode[1:0] is 2'b01, the CPU or the IO peripheral accesses the DRAM by using a 3+1 access channel interleaving mode, when the value of chan_mode [1:0] is 2'b10, the CPU or the IO peripheral accesses the DRAM by using a double-access channel interleaving mode, and when the value of chan_mode[1:0] is 2'b11, the CPU or the IO peripheral accesses the DRAM by using a single channel. Therefore, a mode of accessing a DRAM by the access instruction may be determined according to a preset mapping relationship between high-order addresses and access modes.

Optionally, there is a one-to-one mapping between values of the second field and interleaving granularities.

Specifically, the CPU or the TO peripheral sends an access instruction including an access address to the bus, and a second field in the access address indicates an interleaving granularity. The bus may preset a mapping relationship between values of the second field and interleaving granularities. An interleaving granularity corresponding to a value of the second field may be determined according to the mapping relationship. Further, a value of x may be known according to x=chan_gran[2:0]+6, an access channel for accessing the DRAM may be selected by using PA[x+1:x] (x∈[7:12]), and a DRAM address PA[30:0]={PA[32:x+2], PA[x−1:0]} corresponding to each channel may be determined.

Optionally, the interleaving granularity includes any one of 128 bytes, 256 bytes, 512 bytes, 1024 bytes, 2048 bytes, or 4096 bytes.

For example, a mapping relationship between values of the second field and interleaving granularities is preset. When the value of the second field chan_gran[2:0] is 3'b000or 3'b111, the interleaving granularity may be 128 bytes, when chan_gran[2:0]=1 (that is, chan_gran[2:0]=3'b001), a corresponding interleaving granularity supports 128 bytes, when chan_gran[2:0]=2(that is, chan_gran[2:0]=3'b010), a corresponding interleaving granularity supports 256 bytes, when chan_gran[2:0]=3 (that is, chan_gran[2:0]=3'b011), a corresponding interleaving granularity supports 512 bytes, when chan_gran[2:0]=4, (that is, chan_gran[2:0]=3'b100), a corresponding interleaving granularity supports 1024 bytes, when chan_gran[2:0]=5 (that is, chan_gran[2:0]=3'b101), a corresponding interleaving granularity supports 2048 bytes, and when chan_gran[2:0]=6 (that is, chan_gran[2:0]=3'b110), a corresponding interleaving granularity supports 4096 bytes.

Storage space mapped by a DRAM address is determined according to an interleaving granularity. For example, if the interleaving granularity is 128 B, an address of DRAM 0 supports 0 to 128 B, an address of DRAM 1 supports 128 B to 256 B, an address of DRAM 2 supports 256 B to 384 B, and an address of DRAM 3 supports 256 B to 384 B, or if the interleaving granularity is 256 B, an address of the DRAM 0 supports 0 to 256 B, an address of the DRAM 1 supports 256 B to 512 B, an address of the DRAM 2 supports 512 B to 768 B, and an address of the DRAM 3 supports 768 B to 1 kilobyte (KB). Similarly, a range supported by each DRAM address corresponding to the interleaving granularity of 512 B, 1 KB, 2 KB, or 4 KB can be deduced by analogy.

TABLE 1

| chan_gran[2:0] | Interleaving granularity | Descriptions |
| --- | --- | --- |
| 3'b000 | Default (Default) | The value is reserved, but is decoded as 128-Byte address interleaving. |
| 1 to 6 | 2^(chan_gran + 6) Byte | Support 128 Bytes, 256 Bytes, 512 Bytes, 1 KBytes, 2 KBytes, 4 KBytes. |
| 3'b111 | Reserved | The value is reserved, but is decoded as 128-Byte address interleaving. |

To sum up, a correspondence between chan_gran[2:0] and interleaving granularities may be shown in Table 1. A value of x is determined according to a value of chan_gran[2:0] (chan_gran[2:0] ∈[1:6]), that is, x=chan_gran[2:0]+6 (x∈ [7:12]). This embodiment of the present disclosure can implement configuration of multiple interleaving granularities according to requirements, and compared with the prior art, improves bandwidth balance and utilization of access channels of a DRAM.

In S120, the access channel and an address corresponding to the access channel are determined according to the first field and the second field.

Specifically, the CPU or the TO peripheral accesses information stored in the DRAM by using the bus. The access address in the access instruction includes a first field that is used to indicate an interleaving mode for accessing a DRAM. The access address further includes a second field that is used to indicate an interleaving granularity for accessing a DRAM. An interleaving mode and an interleaving granularity that are used are determined according to the first field and the second field. Further, an access channel for accessing the DRAM and an address corresponding to the access channel are selected. Optionally, the determining, according to the first field and the second field, the access channel and an address corresponding to the access channel includes, when a value of the first field indicates that the interleaving mode is a 3+1 access channel interleaving mode, determining a third field in the physical address, where the third field is used to instruct to access the DRAM by using three access channels in an interleaving manner, or access the DRAM by using a single access channel, when a value of the third field instructs to access the DRAM by using three access channels in an interleaving manner, determining a fourth field in the physical address, where the fourth field is used to instruct to select an access channel from the three access channels, determining a value of the fourth field according to a value of the second field, determining, according to a preset mapping relationship between different values of the fourth field and the three access channels, a first access channel corresponding to the value of the fourth field, and determining, according to the value of the fourth field, an address corresponding to the first access channel.

Specifically, in this embodiment of the present disclosure, the four access channels may be isolated, so as to form different access modes to meet multiple application requirements, and utilization of a DRAM can be improved. For example, modes in which the CPU or the IO peripheral accesses a DRAM may include a four-access channel interleaving mode, a 3+1 access channel interleaving mode, a double-access channel interleaving mode, a single access channel mode, and the like.

Figure 4:
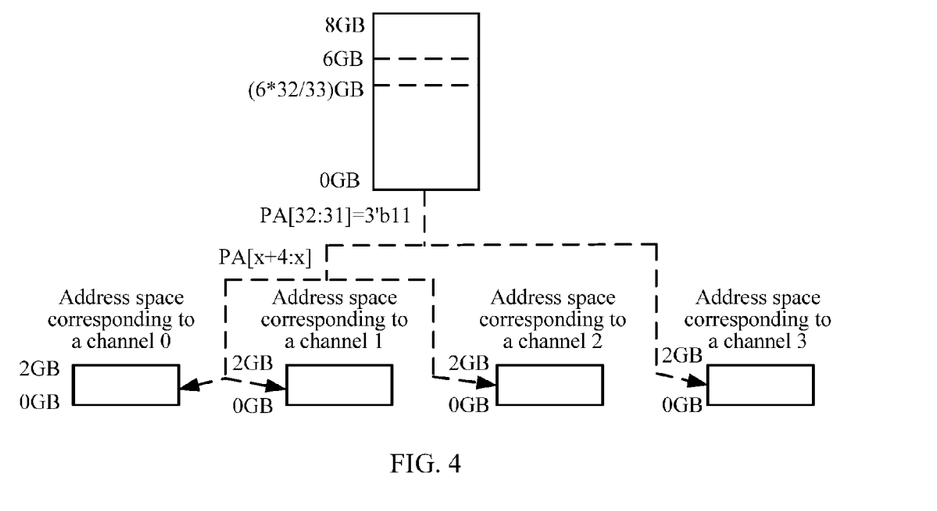
FIG. 4 is a schematic diagram of interaction of a method for accessing a DRAM according to another embodiment of the present disclosure.

As shown in FIG. 4, in the 3+1 access channel interleaving mode, an access channel is isolated to form a single access channel, and the other three access channels are interleaved to access the DRAM. It can be known from the foregoing that if two bits are configured for the first field that indicates an interleaving mode (that is, chan_mode[1:0]), when a value of chan_mode[1:0] is 2'b01, it can be determined that the CPU or the IO peripheral accesses the DRAM by using the 3+1 access channel interleaving mode. Further, a single access channel is determined according to that PA[32:31] (that is, the third field) is equal to 2'b11(that is, the value of the third field), and the access instruction accesses the DRAM by using only an access channel 3, when PA[32:31]!=2'b11, the access instruction accesses three access channels of the DRAM: an access channel 0, an access channel 1, and an access channel 2 in an interleaving manner.

When the access instruction accesses the three access channels: the access channel 0, the access channel 1, and the access channel 2 in an interleaving manner, an access channel is selected according to PA[x+4:x] (that is, the fourth field) (x∈[7:12], and when a value of chan_gran ranges from 1 to 6, x=6+chan_gran[2:0], and in other cases, x=7). Specifically, a specific value of x may be determined according to the value of the second field, and further, fields in the physical address that are used to indicate the fourth field may be determined, so as to know the value of the fourth field. An access channel corresponding to the value of the fourth field can be obtained by looking up the following Table 2 (that is, a preset mapping relationship between different values of the fourth field and the three access channels). In addition, a value of mode3_foor_PA[3:0] may be obtained by looking up the following Table 2 according to the value of the fourth field, and an address corresponding to the access channel may be determined according to PA[30:0]={(PA[32:x+5]*11+mode3_foor_PA[3:0], PA[x-1:0]}.

TABLE 2

| mode3_foor_PA[3:0] | PA[x + 4:x] | | |
|---|---|---|---|
| Channel index | Channel 0 | Channel 1 | Channel 2 |
| 0 | 0 | 1 | 2 |
| 1 | 3 | 4 | 5 |
| 2 | 6 | 7 | 8 |
| 3 | 9 | 10 | 11 |
| 4 | 12 | 13 | 14 |
| 5 | 15 | 16 | 17 |
| 6 | 18 | 19 | 20 |
| 7 | 21 | 22 | 23 |
| 8 | 24 | 25 | 26 |
| 9 | 27 | 28 | 29 |
| 10 | 30 | 31 | Not used |

For example, assuming that a global physical address (Global PA) [37:0]=38'b 001 01 0 0000 0000 0000 0000 0001 1110 1000 0000 (binary code)=0x0c 0000 1e80 (hexadecimal code), according to a high-order address: chan_mode[1:0]=Global[34:33]=2'b01 and chan_gran[2:0]=3'b001, it can be known that the address indicates that an interleaving granularity is 128 bytes (that is, x=7), and an interleaving mode is the 3+1 access channel interleaving mode. Moreover, Global PA[32:31]=2'b00, which indicates that the access instruction accesses, in an interleaving manner, the DRAM by using three access channels: the access channel 0, the access channel 1, and the access channel 2. It can be known, according to x=7, that interleaving access among the three access channels is determined according to PA[11:7]=11101 (binary)=29 (binary). It can be determined, by looking up Table 2, that the access instruction accesses the DRAM by using the access channel 2. In addition, mode3_floor_PA[3:0]=9 can further be determined by looking up Table 2, and therefore, Channel PA[30:0]={(Global PA[32:12]*11 +mode3_floor_PA[3:0]), Global PA[6:0]}={(0x1*11+9), 0x00}=0xa00. Further, DRAM 2 is accessed according to the access channel 2 and an address PA corresponding to the access channel 2.

It should be noted that according to Table 2, PA[x+4:x] (x∈[7:12], when a value of chan_gran ranges from 1 to 6, x=6+chan_gran[2:0], in other cases, x=7) ranges from 0 to 31 in the table, but the mapped three access channels range from 0 to 32, resulting in that a piece of memory in the access channel 2 is not used, and the access channel utilization is 32/33 in a three-access channel interleaving mode.

It should be understood that, interleaving access among the three access channels is determined according to PA[x+4:x], and is obtained through careful calculation. Factors such as DRAM utilization and an optimal code comprehensive frequency of a register transport level (RTL) circuit are considered comprehensively, to avoid that the DRAM utilization declines because a bit width is less than 5 bits, or that a time sequence is deteriorated and the comprehensive frequency cannot be improved due to an excessively large bit width. This is not limited in the present disclosure.

Optionally, the method further includes, when the value of the third field instructs to access the DRAM by using a single access channel, determining, according to the third field, the single access channel and an address corresponding to the single access channel.

Specifically, the bus learns, according to the access address, that the access mode is a 3+1 access channel mode, and then determines, according to PA[32:31] (that is, the third field)=2'b11 (that is, the value of the third field), that the access instruction accesses the DRAM by using only an access channel 3. Further, a physical address from which the third field has been removed is determined as the access address PA[30:0]=PA[30:0].

Therefore, when the DRAM can be accessed by using only some channels in a particular application scenario, power consumption can be reduced by using an isolated single channel to access the DRAM, or, when the CPU and the IO peripheral access the DRAM at the same time, utilization of the DRAM can be improved by means of channel isolation. In addition, after a single access channel is reserved, channel space corresponding to three access channels that are parallel to the single access channel is used in the same way as channel space corresponding to the four access channels.

Optionally, the determining, according to the first field and the second field, the access channel and an address corresponding to the access channel includes, when the value of the first field indicates that the interleaving mode is a four-access channel interleaving mode, determining a seventh field in the physical address, where the seventh field is used to instruct to select an access channel from the four access channels to access the DRAM, determining a value of the seventh field according to the value of the second field, determining, according to a preset mapping relationship between different values of the seventh field and the four access channels, a third access channel corresponding to the value of the seventh field, and determining, according to the seventh field, an address corresponding to the third access channel.

Figure 5:
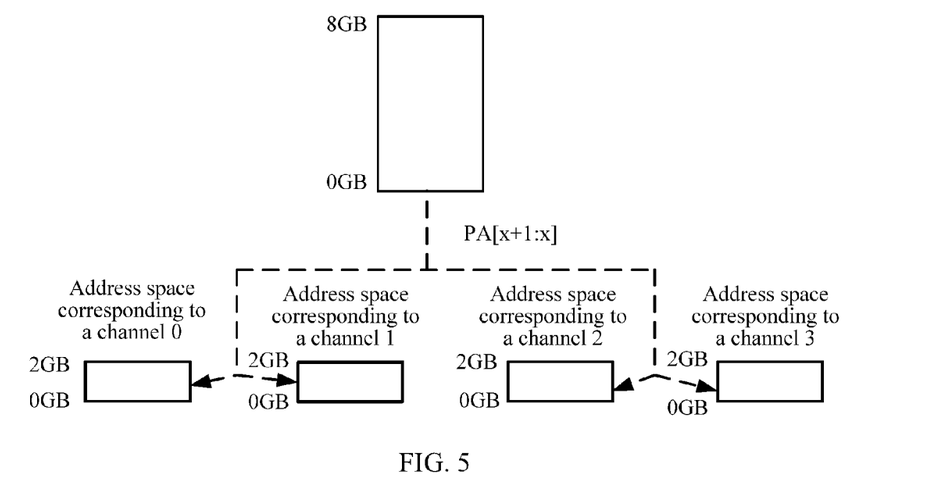
FIG. 5 is a schematic diagram of interaction of a method for accessing a DRAM according to an embodiment of the present disclosure.

Specifically, as shown in FIG. 5, in the four-access channel interleaving mode, the CPU or the IO peripheral sends an instruction for accessing a DRAM, and accesses, according to different address interleaving granularities, four access channels of the DRAM in an interleaving manner. It can be known from the foregoing that, according to the first field that indicates an access channel interleaving mode, when chan_mode[1:0] is 2'b00, the CPU or the IO peripheral accesses the DRAM by using the four-access channel interleaving mode.

The access instruction may select a channel according to PA[x+1:x]. If x=7, then PA[x+1:x]=PA[8:7] (that is, the seventh field), that is, an access channel is selected according to values of 7 bit and 8 bit to access the DRAM. If PA[8:7]=2'b00 (that is, the value of the seventh field), the DRAM is accessed by using the Channel 0, if PA[8:7]=2'b01, the DRAM is accessed by using the Channel 1, if PA[8:7]=2'b10, the DRAM is accessed by using the Channel 2, or if PA[8:7]=2'b11, the DRAM is accessed by using the Channel 3.

A value of x may be determined according to the value of the second field, that is, when a value of chan_gran ranges from 1 to 6, x=6+chan_gran[2:0], and in other cases, x=7. Further, a channel in the four-access channel interleaving mode is selected according to PA[x+1:x]. Further, a physical address from which the seventh field has been removed is determined as the address corresponding to the selected access channel: PA[30:0]={PA[32:x+2], PA[x−1:0]}.

Optionally, the determining, according to the first field and the second field, the access channel and an address corresponding to the access channel includes, when the first field indicates that the interleaving mode is a double-access channel interleaving mode, determining a fifth field in the physical address, where the fifth field is used to instruct to select an access channel combination from two access channel combinations to access the DRAM, when a value of the fifth field instructs to access, in an interleaving manner, the DRAM by using two access channels in a first access channel combination, determining a sixth field in the physical address, where the sixth field is used to instruct to select an access channel from the first access channel combination to access the DRAM, determining a value of the sixth field according to the value of the second field, determining, according to a preset correspondence between different values of the sixth field and the access channels in the first access channel combination, a second access channel corresponding to the value of the sixth field, and determining, according to the fifth field and the sixth field, an address corresponding to the second access channel.

Figure 6:
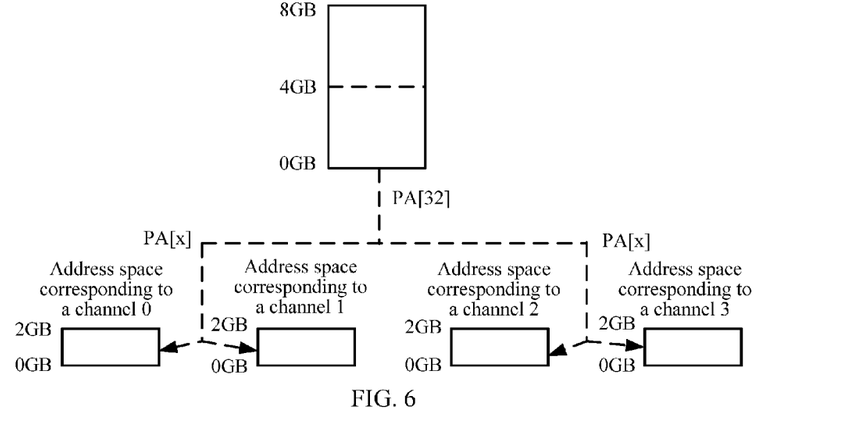
FIG. 6 is a schematic diagram of interaction of a method for accessing a DRAM according to another embodiment of the present disclosure.

Specifically, in the double-access channel interleaving mode, four access channels are classified into two combinations, accessing is performed in an interleaving manner by using two access channels in each combination, and access channels in one combination are isolated from those in the other combination (as shown in FIG. 6). When chan_mode[1:0] is 2'b10, the CPU or the IO peripheral accesses the DRAM by using the double-access channel interleaving mode.

Specifically, if PA[32] (that is, the fifth field)=1'b0 (that is, the value of the fifth field), the access instruction accesses the DRAM by using the access channel 0 and the access channel 1 (which may be considered as a first access channel combination) in an interleaving manner. A value of x is determined according to the value of the second field, that is, when a value of chan_gran ranges from 1 to 6, x=6+chan_gran[2:0], and in other cases, x=7. Further, an access channel is selected from the access channel 0 and the access channel 1 according to a value of PA[x] (that is, the sixth field), and an address corresponding to the selected access channel is determined according to PA[30:0]={PA[31:x+1], PA[x−1:0]} (that is, a physical address from which the fifth field or the sixth field has been removed is determined as the address corresponding to the selected access channel).

For example, if PA[x]=0, the access instruction selects the access channel 0 to access the DRAM, or if PA[x]=1, the access instruction selects the access channel 1 to access the DRAM.

When PA[32]=1'b0, the access instruction accesses the DRAM by using the access channel 2 and the access channel 3 (which may be considered as a second access channel combination) in an interleaving manner. A value of x is determined according to the value of the second field, that is, when a value of chan_gran ranges from 1 to 6, x=6+chan_gran[2:0], and in other cases, x=7. Further, an access channel is selected from the access channel 2 and the access channel 3 according to PA[x], and an address corresponding to the selected access channel is determined according to PA[30:0]={PA[31:x+2], PA[x−1:0]}.

For example, if PA[x]=0, the access instruction selects the access channel 2 to access the DRAM, or if PA[x]=1, the access instruction selects the access channel 3 to access the DRAM.

Optionally, the determining, according to the first field and the second field, the access channel and an address corresponding to the access channel includes, when the first field indicates that the interleaving mode is a single-access channel mode, determining an eighth field in the physical address, where the eighth field is used to instruct to select a single channel to access the DRAM, and determining, according to the eighth field, the selected single access channel and an address corresponding to the selected single access channel.

Figure 7:
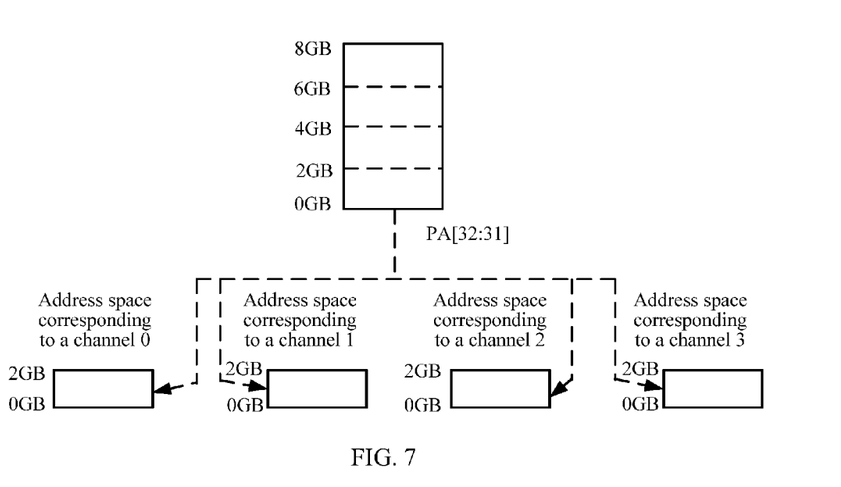
FIG. 7 is a schematic diagram of interaction of a method for accessing a DRAM according to another embodiment of the present disclosure.

Specifically, in the single access channel mode, each access channel is independent, and an access channel for accessing the DRAM may be determined according to an address in the access instruction (as shown in FIG. 7). When chan_mode[1:0] is 2'b11, there is no address interleaving between access channels.

An access channel for the access instruction is selected according to PA[32:31] (that is, the eighth field). When PA[32:31]=2'b00, the instruction accesses only the channel 0, when PA[32:31]=2'b01, the instruction accesses only the channel 1, when PA[32:31]=2'b10, the instruction accesses only the channel 2, and when PA[32:31]=2'b11, the instruction accesses only the channel 3. Correspondingly, an access address corresponding to the access channel is PA[30:0]=PA[30:0] (that is, a physical address from which the eighth field has been removed is determined as the address corresponding to the access channel).

It should be understood that, there is no need to consider impact of an interleaving granularity on selection of an access channel.

To sum up, a mapping relationship between values of the first field chan_mode[1:0] and access channel interleaving modes may be shown in Table 3.

TABLE 3

| chan_mode[1:0] | Interleaving mode | Descriptions |
| --- | --- | --- |
| 2'b00 | Four-access channel interleaving | The instruction for accessing a DRAM is to access, according to different address interleaving granularities, four access channels of the DRAM in an interleaving manner. |
| 2'b01 | 3 + 1 access channel interleaving | When the address of the instruction for accessing a DRAM is PA[32:31] = 2'b11, a single access channel is selected, and the instruction accesses only the access channel 3, and when the address of the instruction for accessing a DRAM is PA[32:31]! = 2'b11, the instruction accesses three access channels of the DRAM: the access channel 0, the access channel 1, and the access channel 2 in an interleaving manner. |
| 2'b10 | Double-access channel interleaving | When the address of the instruction for accessing a DRAM is PA[32] = 1'b0, the access instruction performs address interleaving between the access channel 0 and the access channel 1 according to different interleaving granularities, and when the address of the instruction for accessing a DRAM is PA[32] = 1'b0, the access instruction performs address interleaving between the access channel 2 and the access channel 3 according to different interleaving granularities. |
| 2'b11 | Single-access channel interleaving | There is no address interleaving between access channels, and an access channel for the access instruction is selected according to PA[32:31]: when the address of the instruction for accessing a DRAM is PA[32:31] = 2'b00, the instruction accesses only the channel 0, when the address of the instruction for accessing a DRAM is PA[32:31] = 2'b01, the instruction accesses only the channel 1, when the address of the instruction for accessing a DRAM is PA[32:31] = 2'b10, the instruction accesses only the channel 2, and when the address of the instruction for accessing a DRAM is PA[32:31] = 2'b11, the instruction accesses only the channel 3. |

In addition, if y is used to indicate an address channel PA[30:0] of an access channel for a DRAM, and x is used to indicate Global PA[34:0], then no matter which access channel interleaving mode is used, x and y are in a one-to-one mapping. If the following definitions are made: y=f(x), where f(x) indicates a mapping relationship between y and x in the four-access channel interleaving mode (as shown in FIG. 5), y=i(x), where i(x) indicates a mapping relationship between y and x in the 3+1 access channel interleaving mode (as shown in FIG. 4), y=g(x), where g(x) indicates a mapping relationship between y and x in the double-access channel interleaving mode (as shown in FIG. 6), and y=h(x), where h(x) indicates a mapping relationship between y and x in the single-access channel interleaving mode (as shown in FIG. 7), in this case, in this embodiment of the present disclosure, different value ranges (continuous address intervals) of y are allocated to different interleaving modes, and value ranges of x in different interleaving modes may be obtained according to reverse mapping relationships between y and x in different interleaving modes. In this way, it can be ensured that storage space mapped by different interleaving modes does not overlap.

In S130 (shown in FIG. 2), the DRAM is accessed according to the access channel and the address corresponding to the access channel.

Therefore, according to the method for accessing a dynamic random access memory DRAM in this embodiment of the present disclosure, an access instruction including an access address is received, where a first field additionally set in the access address indicates an interleaving mode, and a second field additionally set in the access address indicates an interleaving granularity, an access channel and an address corresponding to the access channel are determined according to the interleaving mode and the interleaving granularity, and the DRAM is accessed according to the access channel and the address corresponding to the access channel, so as to implement a control manner that can simultaneously support multiple interleaving modes and interleaving granularities.

The method for accessing a DRAM according to this embodiment of the present disclosure is described above with reference to FIG. 2 and FIG. 3 to FIG. 7. The following describes, by using FIG. 8, an apparatus for accessing a DRAM according to an embodiment of the present disclosure.

Figure 8:
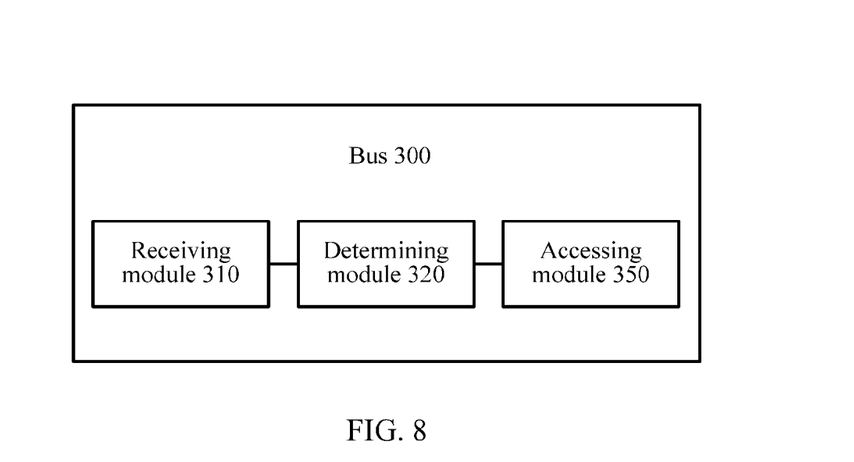
FIG. 8 is a schematic block diagram of a bus for accessing a DRAM according to an embodiment of the present disclosure.

FIG. 8 is a schematic block diagram of a bus 300 for accessing a DRAM according to an embodiment of the present disclosure. As shown in FIG. 8, the bus 300 includes a receiving module 310, configured to receive an access instruction, where the access instruction includes an access address, the access address includes a physical address, and a first field and a second field that are additionally set, the first field is used to indicate an interleaving mode, the interleaving mode indicates a manner of selecting an access channel, the second field is used to indicate an interleaving granularity, and the interleaving granularity indicates a capacity of an address space corresponding to the access channel, a determining module 320, configured to determine, according to the first field and the second field, the access channel and an address corresponding to the access channel, and an accessing module 350, configured to access the DRAM according to the access channel and the address corresponding to the access channel.

Therefore, by means of an apparatus for accessing a DRAM in this embodiment of the present disclosure, an access instruction including an access address is received, where a first field additionally set in the access address indicates an interleaving mode, and a second field additionally set in the access address indicates an interleaving granularity, an access channel and an address corresponding to the access channel are determined according to the interleaving mode and the interleaving granularity, and the DRAM is accessed according to the access channel and the address corresponding to the access channel, so as to implement a control manner that can simultaneously support multiple interleaving modes and interleaving granularities.

In this embodiment of the present disclosure, optionally, the determining module 320 is specifically configured to, when a value of the first field indicates that the interleaving mode is a 3+1 access channel interleaving mode, determine a third field in the physical address, where the third field is used to instruct to access the DRAM by using three access channels in an interleaving manner, or access the DRAM by using a single access channel; when a value of the third field instructs to access the DRAM by using three access channels in an interleaving manner, determine a fourth field in the physical address, where the fourth field is used to instruct to select an access channel from the three access channels, determine a value of the fourth field according to a value of the second field, determine, according to a preset mapping relationship between different values of the fourth field and the three access channels, a first access channel corresponding to the value of the fourth field, and determine, according to the value of the fourth field, an address corresponding to the first access channel.

In this embodiment of the present disclosure, optionally, the bus 300 is further configured to, when the value of the third field instructs to access the DRAM by using a single access channel, determine, according to the third field, the single access channel and an address corresponding to the single access channel.

In this embodiment of the present disclosure, optionally, the determining module 320 is specifically configured to, when the first field indicates that the interleaving mode is a double-access channel interleaving mode, determine a fifth field in the physical address, where the fifth field is used to instruct to select an access channel combination from two access channel combinations to access the DRAM, when a value of the fifth field instructs to access, in an interleaving manner, the DRAM by using two access channels in a first access channel combination, determine a sixth field in the physical address, where the sixth field is used to instruct to select an access channel from the first access channel combination to access the DRAM, determine a value of the sixth field according to the value of the second field, determine, according to a preset correspondence between different values of the sixth field and the access channels in the first access channel combination, a second access channel corresponding to the value of the sixth field, and determine, according to the fifth field and the sixth field, an address corresponding to the second access channel.

Optionally, in this embodiment of the present disclosure, the determining module 320 is specifically configured to, when the value of the first field indicates that the interleaving mode is a four-access channel interleaving mode, determine a seventh field in the physical address, where the seventh field is used to instruct to select an access channel from the four access channels to access the DRAM, determine a value of the seventh field according to the value of the second field, determine, according to a preset mapping relationship between different values of the seventh field and the four access channels, a third access channel corresponding to the value of the seventh field, and determine, according to the seventh field, an address corresponding to the third access channel.

In this embodiment of the present disclosure, optionally, the determining module 320 is specifically configured to, when the first field indicates that the interleaving mode is a single-access channel mode, determine an eighth field in the physical address, where the eighth field is used to instruct to select a single channel to access the DRAM, and determine, according to the eighth field, the selected single access channel and an address corresponding to the selected single access channel.

In this embodiment of the present disclosure, optionally, a length of the first field is two bits.

Optionally, in this embodiment of the present disclosure, a length of the second field is three bits.

In this embodiment of the present disclosure, optionally, there is a one-to-one mapping between values of the first field and interleaving modes.

Optionally, in this embodiment of the present disclosure, there is a one-to-one mapping between values of the second field and interleaving modes.

In this embodiment of the present disclosure, optionally, the interleaving granularity includes any one of 128 bytes, 256 bytes, 512 bytes, 1024 bytes, 2048 bytes, or 4096 bytes.

Therefore, by means of a bus for accessing a DRAM in this embodiment of the present disclosure, an access instruction including an access address is received, where a first field additionally set in the access address indicates an interleaving mode, and a second field additionally set in the access address indicates an interleaving granularity, an access channel and an address corresponding to the access channel are determined according to the interleaving mode and the interleaving granularity, and the DRAM is accessed according to the access channel and the address corresponding to the access channel, so as to implement a control manner that can simultaneously support multiple interleaving modes and interleaving granularities.

Figure 9:
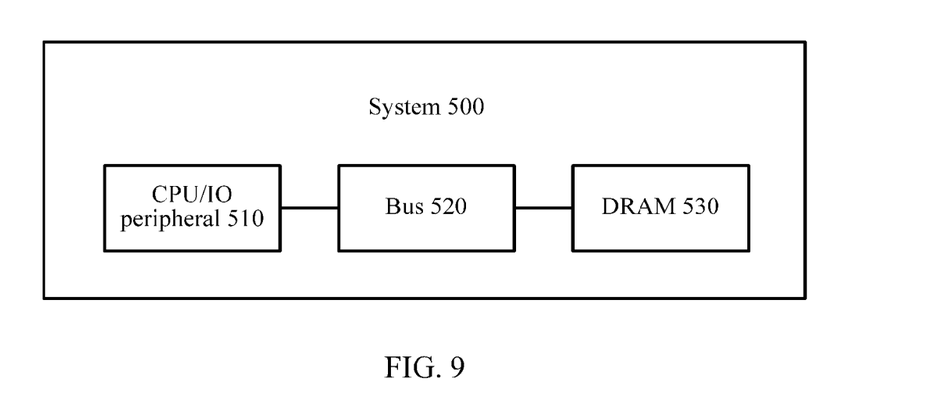
FIG. 9 is a schematic block diagram of a system for accessing a DRAM according to an embodiment of the present disclosure.

FIG. 9 is a system for accessing a DRAM according to an embodiment of the present disclosure. The system 500 includes a CPU or an IO peripheral 510, a bus 520 according to an embodiment of the present disclosure, and a DRAM 530 according to an embodiment of the present disclosure.

Specifically, the system for accessing a DRAM may include at least one processor (for example, a CPU), at least one network interface or other communication interfaces, a memory, and at least one communication bus configured to implement connection communication between these apparatuses. The processor is configured to execute an executable module stored in a memory, for example, a computer program. The memory may include a high-speed random access memory (RAM), and may further include a non-volatile memory, for example, at least one magnetic disk memory. Communication connection to at least one another network element is implemented by using at least one network interface (which may be wired or wireless).

It should be understood that specific examples in the present disclosure are merely intended for helping a person skilled in the art to better understand the embodiments of the present disclosure, but are not for limiting the scope of the embodiments of the present disclosure.

It should further be understood that in the embodiments of the present disclosure, "B corresponding to A" indicates that B is associated with A, and B may be determined according to A. However, it should further be understood that determining B according to A does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in a form of a software functional module and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal system bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for accessing a dynamic random access memory (DRAM), comprising:
   receiving an access instruction, wherein the access instruction comprises an access address, wherein the access address comprises a physical address, a first field, and a second field, wherein the first field is used to indicate an interleaving mode selected from multiple interleaving modes, wherein the interleaving mode indicates a manner of selecting an access channel for accessing the DRAM, wherein the second field is used to indicate an interleaving granularity selected from multiple interleaving granularities, and wherein the interleaving granularity indicates a capacity of an address space corresponding to the access channel;
   determining, according to the first field and the second field, the access channel and an address corresponding to the access channel; and
   accessing, using the interleaving mode and the interleaving granularity, the DRAM according to the access channel and the address corresponding to the access channel,
   wherein at least one access channel of the DRAM is isolated from at least another access channel of the DRAM such that access channels of the DRAM simultaneously support multiple interleaving modes and interleaving granularities for accessing the DRAM.

2. The method according to claim 1, wherein when the first field indicates a 3+1 access channel interleaving mode, determining the access channel and the address corresponding to the access channel comprises:
   determining a third field in the physical address, wherein the third field is used to instruct to access the DRAM among three access channels in an interleaving manner;
   determining a fourth field in the physical address, wherein the fourth field is used to instruct to select an access channel from the three access channels;
   determining a value of the fourth field according to a value of the second field;
   determining, according to a preset mapping relationship between different values of the fourth field and the three access channels, a first access channel corresponding to the value of the fourth field; and
   determining, according to the value of the fourth field, an address corresponding to the first access channel.

3. The method according to claim 1, wherein when a value of the first field indicates that the interleaving mode is a 3+1 access channel interleaving mode, determining the access channel and the address corresponding to the access channel comprises determining a third field in the physical address, wherein the third field is used to instruct to access the DRAM by using a single access channel, wherein the single access channel is isolated from three other access channels of the DRAM, and wherein the three other access channels are interleaved to access the DRAM.

4. The method according to claim 3, wherein the method further comprises determining, according to the third field, the single access channel and an address corresponding to the single access channel.

5. The method according to claim 1, wherein determining the access channel and an address corresponding to the access channel comprises:

determining a fifth field in the physical address when the first field indicates a double-access channel interleaving mode, wherein the fifth field is used to instruct to select an access channel combination from two access channel combinations to access the DRAM;

determining a sixth field in the physical address when a value of the fifth field instructs to access, in an interleaving manner, the DRAM by using two access channels in a first access channel combination, wherein the sixth field is used to instruct to select an access channel from the first access channel combination to access the DRAM;

determining a value of the sixth field according to a value of the second field;

determining, according to a preset correspondence between different values of the sixth field and the access channels in the first access channel combination, a second access channel corresponding to the value of the sixth field; and determining, according to the fifth field and the sixth field, an address corresponding to the second access channel.

6. The method according to claim 1, wherein when the first field indicates a four-access channel interleaving mode, determining the access channel and an address corresponding to the access channel comprises:

determining a seventh field in the physical address, wherein the seventh field is used to instruct to select an access channel from four access channels to access the DRAM;

determining a value of the seventh field according to a value of the second field;

determining, according to a preset mapping relationship between different values of the seventh field and the four access channels, a third access channel corresponding to the value of the seventh field; and determining, according to the seventh field, an address corresponding to the third access channel.

7. The method according to claim 1, wherein when the first field indicates that the interleaving mode is a single access channel mode, determining the access channel and an address corresponding to the access channel comprises:

determining an eighth field in the physical address, wherein the eighth field is used to instruct to select a single access channel to access the DRAM; and determining, according to the eighth field, the selected single access channel and an address corresponding to the selected single access channel.

8. The method according to claim 1, wherein the first field comprises at least two bits, and the second field comprises at least three bits.

9. The method according to claim 1, wherein the interleaving granularity is 128 bytes, wherein a first address of the DRAM supports 0 to 128 bytes, a second address of the DRAM supports 128 to 256 bytes, a third address of the DRAM supports 256 to 384 bytes, a fourth address of the DRAM supports 384 to 512 bytes.

10. The method according to claim 1, wherein the interleaving granularity is 256 bytes, wherein a first address of the DRAM supports 0 to 256 bytes, a second address of the DRAM supports 256 to 512 bytes, a third address of the DRAM supports 512 to 768 bytes, a fourth address of the DRAM supports 768 to 1 kilobyte.

11. The method according to claim 1, wherein the interleaving granularity is one of 512 bytes, 1024 bytes, 2048 bytes, or 4096 bytes.

12. A system, comprising:
a dynamic random access memory (DRAM);
a central processing unit (CPU); and
a bus coupled with the DRAM and the CPU, wherein the bus is configured to:
receive an access instruction, wherein the access instruction comprises an access address, wherein the access address comprises a physical address, a first field, and a second field, wherein the first field is used to indicate an interleaving mode selected from multiple interleaving modes, wherein the interleaving mode indicates a manner of selecting an access channel for accessing the DRAM, wherein the second field is used to indicate an interleaving granularity selected from multiple interleaving granularities, and wherein the interleaving granularity indicates a capacity of an address space corresponding to the access channel;
determine, according to the first field and the second field, the access channel and an address corresponding to the access channel; and
access, using the interleaving mode and the interleaving granularity, the DRAM according to the access channel and the address corresponding to the access channel.
wherein at least on one access channel of the DRAM is isolated from at least another access channel of the DRAM such that access channels of the DRAM simultaneously support multiple interleaving modes and interleaving granularities for accessing the DRAM.

13. The system of claim 12, wherein when the first field indicates a 3+1 access channel interleaving mode, the bus is further configured to:
determine a third field in the physical address, wherein the third field is used to instruct to access the DRAM among three access channels in an interleaving manner;
determine a fourth field in the physical address, wherein the fourth field is used to instruct to select an access channel from the three access channels;
determine a value of the fourth field according to a value of the second field;
determine, according to a preset mapping relationship between different values of the fourth field and the three access channels, a first access channel corresponding to the value of the fourth field; and
determine, according to the value of the fourth field, an address corresponding to the first access channel.

14. The system of claim 12, wherein when a value of the first field indicates that the interleaving mode is a 3+1 access channel interleaving mode, the bus is further configured to determine a third field in the physical address, wherein the third field is used to instruct to access the DRAM by using a single access channel, wherein the single access channel is isolated from three other access channels of the DRAM, and wherein the three other access channels are interleaved to access the DRAM.

15. The system of claim 14, wherein the bus is further configured to determine, according to the third field, the single access channel and an address corresponding to the single access channel.

16. The system of claim 12, wherein when the first field indicates a four-access channel interleaving mode, the bus is further configured to:

determine a seventh field in the physical address, wherein the seventh field is used to instruct to select an access channel from four access channels to access the DRAM;

determine a value of the seventh field according to a value of the second field;

determine, according to a preset mapping relationship between different values of the seventh field and the four access channels, a third access channel corresponding to the value of the seventh field; and determine, according to the seventh field, an address corresponding to the third access channel.

17. A system, comprising:
a dynamic random access memory (DRAM);
an input/output (I/O) peripheral; and
a bus coupled with the DRAM and the I/O peripheral, wherein the bus is configured to:
  receive an access instruction, wherein the access instruction comprises an access address, wherein the access address comprises a physical address, a first field, and a second field, wherein the first field is used to indicate an interleaving mode, wherein the interleaving mode indicates a manner of selecting an access channel, wherein the second field is used to indicate an interleaving granularity, and wherein the interleaving granularity indicates a capacity of an address space corresponding to the access channel;
  determine, according to the first field and the second field, the access channel and an address corresponding to the access channel; and
  access the DRAM according to the access channel and the address corresponding to the access channel,
wherein at least one access channel of the DRAM is isolated from at least another access channel of the DRAM such that the DRAM is accessible via different access modes, the different access modes including at least two or more of the following: a four-access channel interleaving mode, a 3+1 access channel interleaving mode, a double-access channel interleaving mode, and a dingle access channel mode.

18. The system according to claim 17, wherein when a value of the first field indicates that the interleaving mode is the 3+1 access channel interleaving mode, a third field in the physical address is used to instruct to access the DRAM by using at least one of a single access channel or three other access channels of the DRAM, and when the third field is used to instruct to access the DRAM by using the three other access channels of the DRAM, accessing the DRAM comprises accessing the three other access channels of the DRAM in an interleaving manner.

19. The system according to claim 17, wherein when a value of the first field indicates that the interleaving mode is the four-access channel interleaving mode, accessing the DRAM comprises accessing, according to different address interleaving granularities, four access channels of the DRAM in an interleaving manner.

20. The system according to claim 17, wherein when a value of the first field indicates that the interleaving mode is the double-access channel interleaving mode, four access channels of the DRAM are classified into two access channel combinations comprising a first access channel combination and a second access channel combination, wherein accessing the DRAM in the double-access channel interleaving mode is performed in an interleaving manner by using two access channels in each access channel combination, and wherein access channels in the first access channel combination are isolated from access channels in the second access channel combination.

* * * * *

UNITED STATES PATENT AND TRADEMARK OFFICE
CERTIFICATE OF CORRECTION

PATENT NO. : 10,452,604 B2
APPLICATION NO. : 15/454014
DATED : October 22, 2019
INVENTOR(S) : Jun Liang, Hu Liu and Zhiqiang Zhang It is certified that error appears in the above-identified patent and that said Letters Patent is hereby corrected as shown below:

Page 1 of 1

In the Claims

Claim 1, Column 22, Line 34: "3+1access" should read "3+1 access"

Claim 9, Column 23, Line 57: "bytes, a fourth" should read "bytes, and a fourth"

Claim 10, Column 23, Line 63: "bytes, a fourth" should read "bytes, and a fourth"

Claim 12, Column 24, Line 26: "channel." should read "channel,"

Claim 17, Column 26, Line 5: "a dingle access" should read "a single access"

Signed and Sealed this
Tenth Day of December, 2019

Andrei Iancu
*Director of the United States Patent and Trademark Office*